April 9, 1935.  W. A. BUCKNER  1,996,900
QUICK COUPLING VALVE WITH LOCK COVER
Filed Dec. 20, 1933
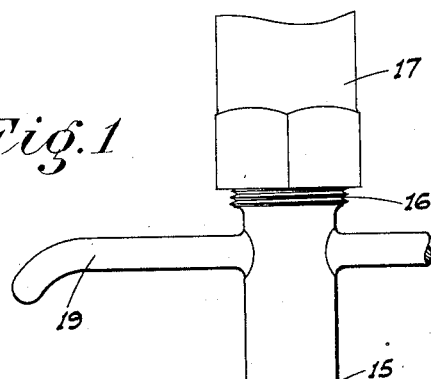
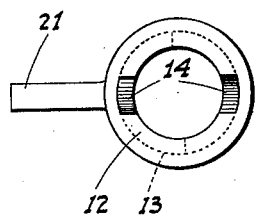
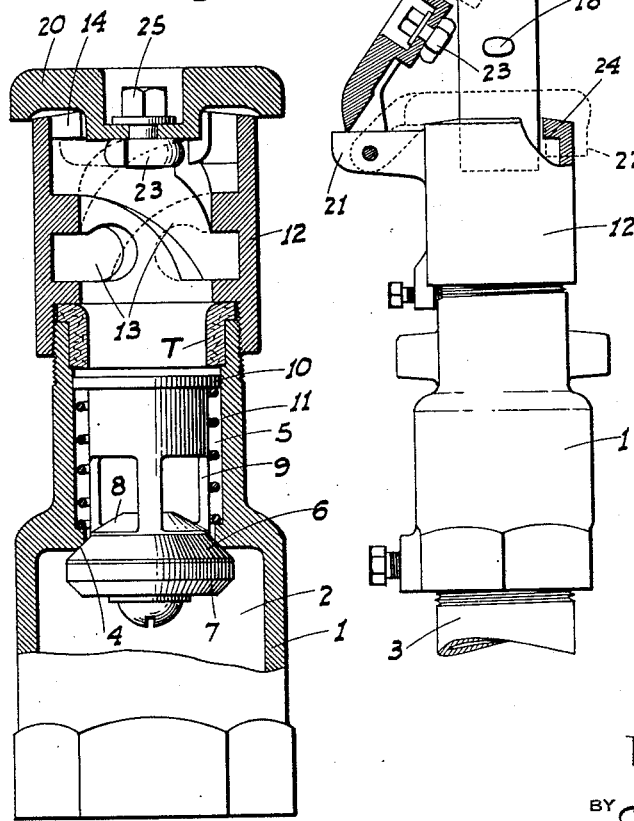
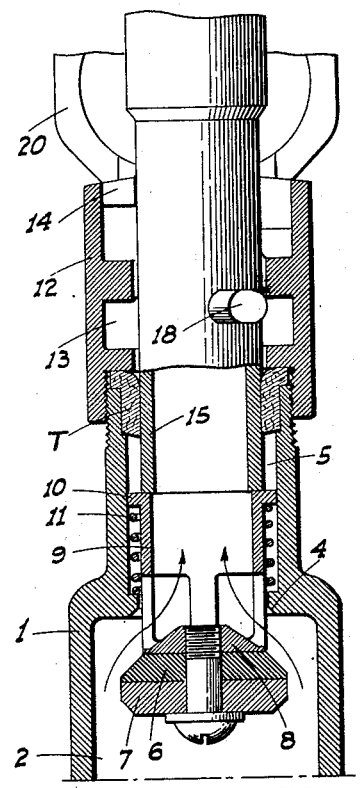
INVENTOR
Wm. A. Buckner
BY
ATTORNEY Patented Apr. 9, 1935

1,996,900

UNITED STATES PATENT OFFICE 1,996,900

QUICK COUPLING VALVE WITH LOCK COVER

William A. Buckner, Fresno, Calif.

Application December 20, 1933, Serial No. 703,231

1 Claim. (Cl. 284—19)

This invention relates to sprinkler systems such as are installed in connection with golf course fairways and similar areas, which utilize underground piping systems and which have take-off fittings at intervals for direct connection to sprinklers or to lengths of hose leading to the same. This invention also relates to fittings of this general character which have self-closing valves therein adapted to be opened by the engagement of the hose or sprinkler coupling therewith such as shown for instance in my Patent No. 1,762,503, dated June 10, 1930, over which the structure of the present invention has considerable improvement.

The principal object of this invention is to provide a fixed valve containing body, a tubular coupling member to enter the body and engage the valve, and cooperating means between the body and coupling arranged so that as the latter is inserted and rotated in the body, the valve will be opened. At the same time, even before the valve is thus opened, a water-tight connection between the coupling and body is automatically made so that there is no danger of any leakage occurring when the valve is initially opened as was sometimes the case with the previous structure. Also the coupling and valve opening operations are performed with the one continuous movement of the coupling in the body and no holding device is then necessary to maintain these members in their coupled position, or the valve in its open position.

I have also provided a cover for the body to prevent dirt and the like getting to the valve, and a simple means for locking the cover against undesired opening movement.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claim.

In the drawing similar characters of reference indicate corresponding parts in the several views:

Figure 1 is a side elevation of the device showing the coupling member initially inserted in the top collar of the body.

Figure 2 is a sectional elevation of the fixed unit of the apparatus showing the coupling removed and the valve closed.

Figure 3 is a similar view showing the coupling fully inserted and the valve open.

Figure 4 is a top plan view of the coupling guide hand actuating collar with the cover removed.

Referring now more particularly to the characters of reference on the drawing, the structure comprises a body 1 having a bottom intake chamber 2 adapted at its lower end for permanent connection to an underground supply pipe 3. The body at the top of the chamber is formed with an inwardly projecting annular and bevelled valve seat 4, above which is another chamber 5 of somewhat smaller diameter than the chamber 2.

A bevelled valve 6 of rubber or the like engages the seat 4 from below. Said valve is mounted between metal heads 7 and 8, the latter being formed on the bottom of an open sided tube 9 which projects upwardly into the chamber 5 and is open on its upper end. The top of the tube has an outwardly projecting flange 10 slidably engaging the wall of said chamber. A compression spring 11 about the tube bears against the flange and the upper surface of the valve seat 4 and acts to raise the tube to a valve seating position.

Secured on and projecting upwardly from the body 1 is a tubular coupling guide hand actuating collar 12. A flexible leather thimble T depends into the chamber 5 above the valve tube and is held in place between the adjacent surface of the body and collar and acts to maintain a watertight seal therebetween besides having another valuable purpose as will be seen later.

The collar is provided with a pair of opposed spiral and circumferentially extending grooves 13 in its internal wall, said grooves extending to opposed openings at the top of the collar, as shown at 14. The lower ends of the grooves have blind terminations above the tube 9 as shown in Figure 2, the upper walls of the grooves at such terminations being raised or recessed somewhat as shown.

The means to open the valve comprises a tubular coupling member 15 which is threaded on its upper end as at 16 for connection to a sprinkler head, or a to swivel unit such as indicated at 17 and to which a length of pipe or hose may be connected. The diameter of the lower portion of the coupling member is less than the bore of the collar but slightly greater than that of the thimble T. Such portion is also provided with a pair of outwardly projecting opposed pins 18 adapted to fit the openings 14 and to move along the spiral grooves 13. These pins are positioned relative to the lower end of the coupling member so that when they are initially engaged with the grooves, said lower end is already projected into the thimble but does not bear on the valve tube. When the pins have moved to the bottom of the grooves with the rotation of the coupling, the botom edge of the latter has engaged and pressed down on the valve tube opening the valve, as shown in Figure 3.

The pressure of the spring 11 forces the pins against the top recessed surface of the groove terminations so that the pins are held against possibly slipping around and up the grooves with the constant spring pressure.

The water can then freely flow past the valve and up the coupling to the hose or sprinkler head connected thereto, the coupling forming a continuous extension of the valve tube 8, so that any back pressure and agitating of the water as it flows is prevented. The bore of the thimble being smaller than the diameter of the coupling, said thimble firmly engages the coupling and makes a water-tight seal so that there is no possibility of water leaking past the outside of the coupling. It will therefore be seen that a water-tight connection is made before the valve is opened and retained until after the valve is fully closed. The coupling member toward its upper end is provided with opposed handle bars 19 whereby it may be readily turned by hand.

The top of the collar is about level with the ground and to keep dirt etc. from getting into the same when the coupling is removed, I provide a cover 20 for the collar hinged onto an extension 21 projecting radially from said collar adjacent the top. The cover has guide lugs 22 depending therefrom on the side opposite the hinge and outwardly of the collar, the edge of the cover between the lugs being concavely curved. This arrangement provides for the easy raising of the cover by engagement with the lower end of the coupling, and the concave curvature of the adjacent portion of the cover, together with the lugs 22, facilitates the centering and guiding of the coupling into an initial position in the collar.

Mounted on and under the cover is a turnable latch tongue 23 adapted to project through one of the openings 14 and to be turned to a locking position under a lip 24 formed as an initial portion of one of the grooves 13. This tongue is connected to a rectangular head 25 disposed axially thereof and countersunk in the cover while being accessible from above the same, so that the tongue can only be turned by a socket wrench to release the cover and cannot be too easily opened, as by an unauthorized person.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:

A valve and coupling unit comprising a passage body adapted at one end for connection to an intake pipe, said body having a normally closed valve therein, a tubular coupling member adapted for removable insertion by hand into the body to engage and move the valve to an open position, a hinged cover on the upper end of the body adapted to be opened by engagement with and manipulation of the lower end of the coupling member prior to insertion, and means formed on the cover and functioning when said cover is open to serve as guides for the initial insertion of the member into the body, said last named means comprising spaced lugs depending from the cover outwardly of the body and on the side opposite the hinge; the edge of the cover between the lugs being concavely curved.

WILLIAM A. BUCKNER.